Oct. 30, 1928.
B. RAETTIG
1,689,559
AUTOMATIC STARTING DEVICE FOR ALTERNATE CURRENT MOTORS
Filed Feb. 9, 1926     2 Sheets-Sheet 1
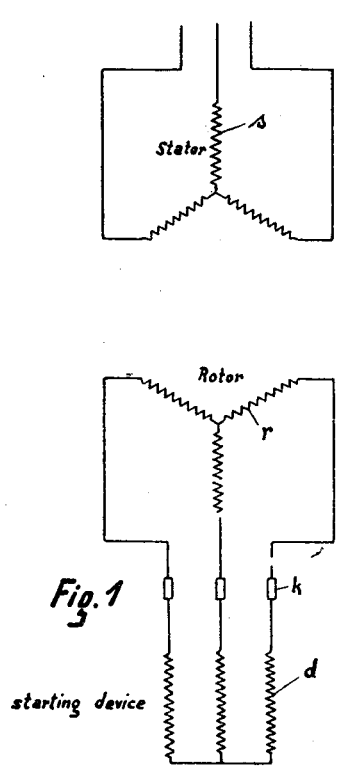
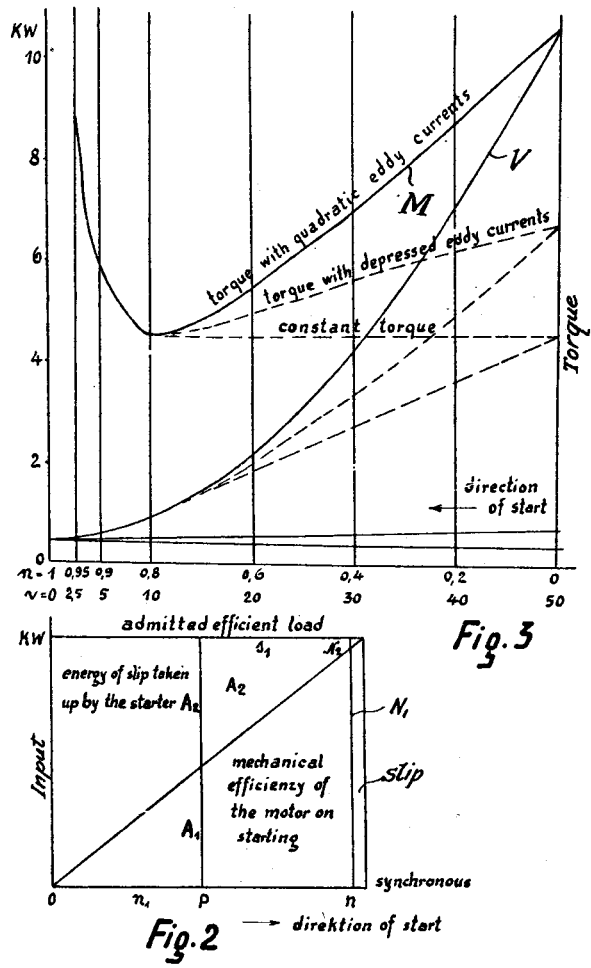
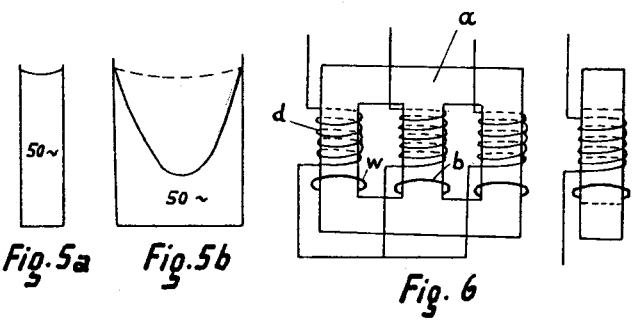
B. Raettig
INVENTOR
By: Marks & Clerk
Attys Oct. 30, 1928.
B. RAETTIG
1,689,559
AUTOMATIC STARTING DEVICE FOR ALTERNATE CURRENT MOTORS
Filed Feb. 9, 1926 2 Sheets-Sheet 2
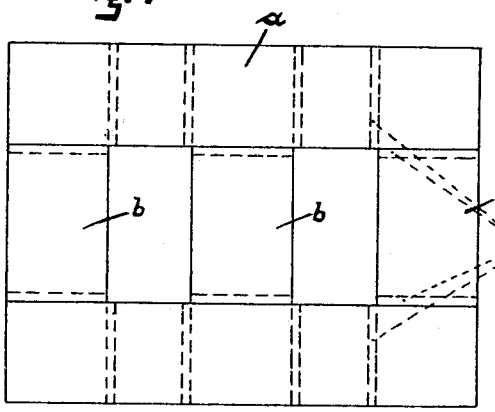
Fig.4ᵃ
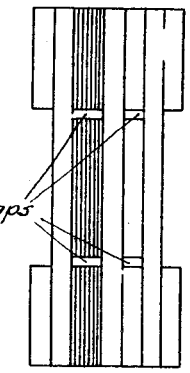
Fig.4
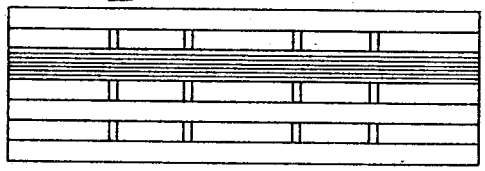
Fig.4ᵇ
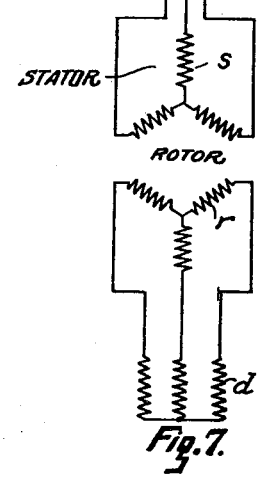
Fig.7.
Inventor:
Bruno Raettig
By Marks & Clerk
Attys Patented Oct. 30, 1928.

1,689,559

UNITED STATES PATENT OFFICE.

BRUNO RAETTIG, OF HOFFNUNGSTHAL, NEAR COLOGNE, GERMANY.

AUTOMATIC STARTING DEVICE FOR ALTERNATE-CURRENT MOTORS.

Application filed February 9, 1926, Serial No. 87,118, and in Germany January 13, 1925.

This invention relates to automatic starting means for alternating current motors, and particularly three-phase motors in which choke coils with magnetizable and preferably closed, yoke-shaped cores are connected in series with the rotor winding of the motor. Choke coils of the kind referred to set up a counter-electromotive force in the starting of the motor which is opposed to the rotor voltage generated by the slip in the rotor. Both are alternating current electromotive forces or voltages the magnitude and frequency of which are proportional to the slip.

With the use of the choke coils only, the motor would not develop any starting torque, and in order to produce such a starting torque, it is necessary to overcome the secondary current. This is effected by the employment of a magnetizable, closed, yoke-shaped core.

As heretofore constructed, choke coils of this kind were provided with a solid core or with a uniformly laminated core of the same cross section similar to standard transformers. With the employment of laminated cores, solid, short-circuited secondary windings were used for the destruction of the slipping energy. With the use of a core solid either throughout its length or through parts of its length, the losses from eddy currents are proportional to the square of the frequency. Since a constant starting torque, however, requires a straight line curve. Motors with the use of solid cores are reduced to approximately half the proper number of rotations.

In the case of high frequencies solid cores will prevent the passage of any appreciable field. In consequence thereof, an excessively high difference of phase relation will occur in the starting operation which reduces the starting torque, and the starting current is accordingly undesirably high.

In the second case, that is to say, with the use of a uniformly laminated core, the generated voltage or line drop is proportional to the frequency, so as to again result in losses approximating the square of the frequency. The starting of a motor of the kind referred to will therefore take place substantially as follows:—

The first current impulse being large, due to the high losses, the motor will start with a jerk and only run at approximately half the desired number of revolutions at about half the required torque. The motor having been started under load, will therefore run at only half the desired number of revolutions and when the required and developed torque are equal, a high current will result which is liable to damage the starter.

In order to overcome these difficulties and with a view of keeping the starting torque relatively constant, the eddy currents generated in the core of the choke coils are reduced by suitable means at a high frequency, that is to say, when the slip has arrived at a high value in accordance with my invention. For this purpose the core may be differently laminated at different points of its cross section, and in such a manner that the non-laminated path for the lines of force will be sufficient for low frequencies, while the highly laminated path of the lines of force will have to be employed with high frequencies, either alone or in combination with the employment of the less laminated section. Laminating the iron cores of choking coils is well known. Likewise to make the core of a certain length of thinner plates and the other part of its length of thicker plates so that the lines of force pass on their path successively through thicker and thinner plates is well known. It was, however, not known to laminate the core in such a manner that plates of different thickness were to be found in a certain cross-sectional area or in all cross-sectional areas, so that the inner part of the cross-sectional area was formed of stronger or thicker plates and the outer part of the cross-sectional area of weaker or thinner plates. This difference as compared with what is known is implied by the phrase: "laminated differently in different places of its cross-sectional area." By this means, the curve of a quadratic equation representing the losses from eddy current is changed to a straight line, inasmuch as with high frequency the lines of force will be directed into that portion of the core which is laminated with thin pieces of sheet iron and which, therefore, shows only small losses from eddy currents, while the residue of lines of force still remaining in the portion of the cross section of the core which is laminated with thicker sheets produces the necessary losses by eddy currents, without, however, allowing them to rise excessively. Upon the reduction of the frequency, the flux will, however, preferably pass through the solid portions. This result may be more easily produced by subdividing the thin laminated part of the core transversely with relation to the flow of the lines of force and, in some cases, even providing it with air gaps and in such a manner that the subdivisions and air gaps do not extend throughout the entire cross sectional area of the core. With a reduction of the frequency the flux will then preferably pass through the solid portions which contain fewer air gaps, so that with a reduction of the frequency comparatively greater losses by eddy currents are produced, so as to counteract the dropping of the starting torque. By a suitable selection of the ratio of the cross section of the core and the number of windings, the result is produced that the difference of phase in the starting circuit is only small on starting, so as to cause the flowing of a high working current which produces a high starting torque with low current.

The different kinds of laminations, in accordance with this invention, will, moreover, result in an extraordinarily intensified formation of the eddy currents, which is greater than in the case of a solid core. With a view of increasing the starting torque, while keeping the mass of the core very low, one or several closed secondary windings may be provided in the well known manner, which, in accordance with this invention, will show approximately straight line increasing losses of energy. For this kind of secondary coils the most suitable are coils of magnetizable material and of square or circular cross section.

The starting device constructed in accordance with this invention may be disposed on the shaft of the rotor as in other well known arrangements and separate from the motor in the well known manner, so that it may turn with the rotor.

In the accompanying drawing, a preferred manner of embodiment of the principles of the invention is shown diagrammatically and by way of example. Fig. 1 is a sketch of the electric connections, Fig. 2 illustrates diagrammatically the procedure according to this invention. Fig. 3 is a diagrammatic illustration of the curves representing the different torques. Figs. 4, 4ª and 4ᵇ illustrate in plan, end and side elevations the construction of an iron core. Figs. 5ª and 5ᵇ are graphs or diagrams of the field distribution. Fig. 6 illustrates diagrammatically the construction of the starting device. Fig. 7 is a diagram of the electrical connections with the starting device mounted on the rotor shaft.

In the sketch of electric connections, according to Fig. 1, $s$ shows the winding of the stator, $r$ indicates the rotor winding, $d$ is the winding of the choke coils, and at $k$ the sliding rings of the rotor are indicated. For clearness in illustrating the mode of operation, it may be assumed that the starting torque and the kilowat input imparted to the stator are constant in accordance with the sketch of Fig. 2. If certain input in kilowatts is admitted to the stator, this amount, aside from the losses in the stator and rotor, will have to be communicated from the rotor to the starting device and will be partially converted into heat in the starting device. In the motor a torque is generated in proportion to the amount of input, but at this moment the motor does not produce any mechanical work. At the point of operation P which corresponds to a point in the starting operation the total energy admitted to the system remains unchanged. A portion thereof $A_1$ is transformed into mechanical work at unchanging torque and with the number of rotations $n_1$. The remainder $A_2$ will have to be converted into heat in the starting device. With synchronous numbers of revolutions all the energy taken up will be transformed into mechanical work, but there would be no voltage drop in the rotor and no current would flow therein adapted to produce a torque. This condition cannot be arrived at, but shortly before this point is reached, the operating conditions will be such that the slip voltage necessary for the current flow will be produced. Thus, besides the input kilowatt transformed into mechanical work $N_1$, there is the remainder $N_2$ which represents the rotor losses. In this connection the stator has been assumed for simplicity's sake to be free from losses, which is admissable for practical purposes.

The transformation into heat above referred to results only for the smallest part from the heat losses of the current in the windings of the rotor and of the starting device and from the hysteresis losses in the iron core. By far the greater part is transformed into heat by eddy currents in the iron core. This iron core is not thinly laminated, so as not to disturb the formation of the eddy currents, but it consists of sheets of greater thickness. The thickness of the metal sheets is selected in accordance with the particular purpose. The heat losses of the currents are independent of the frequency (the slip) and the losses by hysteresis are proportional to the frequency and the losses from eddy currents are proportional to the square of the frequency provided thin metal sheets are used. The eddy current losses are, moreover, approximately proportional to the square of the thickness of the sheets. With the selection of a certain thickness of metal sheets the total losses with different frequencies will therefore be somewhat as shown by the curve V in Fig. 3. Therefrom the torque also shown in Fig. 3 by the curve N is obtained which corresponds to the starting of the motor. This torque is, therefore, not at all constant, broadly considered, inasmuch as at its middle portion it shows a decided minimum. At this point the torque amounts to only about half of the torque at the beginning of the curve.

The reduction of the initial peak of the torque may be produced by the employment of an iron core composed of metal sheets of different thickness. Such an arrangement is shown, for instance, diagrammatically in Fig. 4. In those portions of the cross section of the core which are composed of thick sheets strong eddy currents are produced with high frequencies, that is to say, with a high slip. These eddy currents prevent the increase of the field of force to its full strength, and they consequently counteract the complete formation of the eddy currents. In the thin metal sheets, however, the field may be completely developed, inasmuch as with this arrangement the formation of eddy currents is only limited. In Fig. 5$^a$ the distribution of the field over the cross section of a thin sheet at 50 cycles is shown. Fig. 5$^b$ illustrates the distribution of the field in a thick metal sheet. With the reduction of the frequency the distribution approaches the dotted line of Fig. 5$^b$, so that the entire cross section will then be uniformly traversed by the field of force. It appears, therefore that the employment of a core composed of a combination of thick and thin sheets will produce the result that the curve of the eddy current losses does not follow the curve of a quadratic equation, but that it will rise approximately to a straight line resulting in the desired curve for the torque. This procedure may be further assisted, as already mentioned, by the provision of air gaps in the thinly laminated path of the lines of force, as indicated in Fig. 4. By the arrangement of this air gap the lines with low frequencies will be compelled to flow for the most part from the thin sheets into the thick sheets which are not interrupted. With low frequencies a strong formation of eddy currents will, therefore, take place. With higher frequencies the lines of force are able to pass through the air gap, and they will then mainly flow through the thinly laminated section in view of the high resistance produced in the less laminated portion by the formation of eddy currents, so that the formation of eddy currents is comparatively small with high frequencies.

As it appears from Fig. 6, the eddy current losses may be increased by placing one or more rings of solid metal around each leg of the starting device, the rings being so arranged and selected that they produce the tendency of causing the losses to become linearly increased, in consequence of the great increase of the alternating current resistance at high frequency. This is the case with coils of magnetizable metal, such as iron, of substantially square or circular cross section.

Fig. 6 also indicates diagrammatically the entire construction of the starting device. It comprises the yoke-shaped closed core $a$ on the legs $b$ of which the choke coils $d$ are wound. The legs, webs or the like also carry the secondary windings $w$.

The starting device hereinbefore described operates automatically, without requiring any moving parts. There is no liability of overloading the motor, even when it is arrested, inasmuch as the starting device will then consume the energy and the motor will operate merely as a transformer. If, therefore, on the occasional failing of the voltage, the motor is arrested, it will be normally started again, as soon as the voltage has increased and without requiring any manipulation or switching of the starting device by hand. By the combination of the motor with a starting device mounted on the shaft, as shown in Fig. 7, for instance, in place of the sliding rings on the motor shaft and a stationary starting device, a highly perfected ideal short-circuited motor with great starting torque and low switching current is obtained.

An advantage of this kind of starting device in connection with the motor as described is further presented by the absolute elimination of sparking, in view of the avoiding of the sliding rings, so that the motor is safe from explosions and is well adapted for operation in plants with dusty atmospheres. The employment of the starting device, moreover, obviates the likelihood of rotor defects, inasmuch as the line drop may be kept low in the rotor even with large wire winding.

The cooling of the starting device which, as before mentioned, is effected by a ventilator or fan action during rotation; it may also be performed with oil in the case of the separate mounting of the starting device.

I claim:—

1. An automatic starting device for a polyphase induction motor mounted on the rotor of said induction motor, including in combination, a closed magnetic circuit core, a winding on said core in circuit with each phase winding on the rotor of said motor, said core being composed of laminations of different thicknesses throughout its cross section whereby eddy currents are automatically decreased at high frequencies when there is a relatively large slip.

2. An automatic starting device for a polyphase induction motor mounted on the rotor shaft of said induction motor, including in combination, a closed magnetic circuit core, a winding on said core in circuit with each phase winding on the rotor of said motor, said core being composed of laminations of different thicknesses throughout its cross section whereby eddy currents are automatically decreased at high frequencies when there is a relatively large slip, and a short circuited secondary winding on said core.

3. An automatic starting device for a polyphase induction motor mounted on the rotor of said induction motor, including in combination, a core having a closed magnetic circuit, a winding on said core in circuit with each phase winding on the rotor of said motor, said core being composed of sectional laminations of different thickness arranged throughout its cross section, certain of said sections being spaced to provide air-gaps in their lamination transverse to the path of the magnetic flux, said gaps extending only part way throughout the cross section of the core.

4. An automatic starting device for a polyphase induction motor mounted on the rotor shaft of said induction motor, including in combination, a core having a closed magnetic circuit, a winding on said core in circuit with each phase winding on the rotor of said motor, said core being composed of sectional laminations of different thicknesses arranged throughout its cross section, certain of said sections being spaced to provide air-gaps in their laminations transverse to the path of the magnetic flux, said gaps extending only part way throughout the cross section of the core, and a short circuited secondary winding on said core.

5. An automatic starting device for a polyphase induction motor mounted on the rotor shaft of said induction motor, including in combination, a core having a closed magnetic circuit, a winding on said core in circuit with each phase winding on the rotor of said motor, said core being composed of sectional laminations of different thickness arranged throughout its cross section, certain of said sections being spaced to provide air-gaps in their laminations transverse to the path of the magnetic flux, said gaps extending only part way throughout the cross section of the core, and one or more closed circuited secondary coils on said core, said secondary coils being arranged to provide linearly increasing energy loss.

6. An automatic starting device for a polyphase induction motor mounted on the rotor of said induction motor, including in combination, a core having a closed magnetic circuit, a winding on said core in circuit with each phase winding on the rotor of said motor, said core being composed of sectional laminations of different thicknesses arranged throughout its cross section, certain of said sections being spaced to provide air-gaps in their laminations transverse to the path of the magnetic flux, said gaps extending only part way throughout the cross section of the core, and one or more closed circuited secondary coils of magnetizable material on said core, said secondary coils being arranged to provide linearly increasing energy loss.

In testimony whereof I affix my signature.

BRUNO RAETTIG.